United States Patent [19]

Komatsu

[11] Patent Number: 4,803,675
[45] Date of Patent: Feb. 7, 1989

[54] HIGH SPEED, LOW POWER CONSUMPTION PICKUP HEAD POSITION CONTROL DEVICE IN AN OPTICAL TYPE DISC REPRODUCING DEVICE

[75] Inventor: Hirotake Komatsu, Hamamatsu, Japan

[73] Assignees: Nippon Gakki Seizo Kabushiki Kaisha, Hamamatsu, Japan; Hirotake Komatsu

[21] Appl. No.: 738,826

[22] Filed: May 29, 1985

[30] Foreign Application Priority Data

Jun. 1, 1984 [JP] Japan .................. 59-113680

[51] Int. Cl.⁴ ................... G11B 17/22; G11B 7/00
[52] U.S. Cl. ................................. 369/32; 369/44
[58] Field of Search ............... 369/32, 43, 44, 45; 360/77, 78

[56] References Cited

U.S. PATENT DOCUMENTS

| 4,138,663 | 2/1979 | Lehureau et al. | 369/44 |
| 4,397,009 | 8/1983 | Eriksson | 369/32 |
| 4,403,259 | 9/1983 | Masaki | 369/32 X |
| 4,428,074 | 1/1984 | Abe et al. | 369/32 |
| 4,432,082 | 2/1984 | Hsieh et al. | 369/32 |
| 4,539,664 | 9/1985 | Deguchi et al. | 369/32 X |
| 4,550,393 | 10/1985 | Sugiyama et al. | 369/32 |
| 4,630,250 | 12/1986 | Nonomura | 369/44 X |

FOREIGN PATENT DOCUMENTS

| 0089119 | 2/1983 | European Pat. Off. . | |
| 0098076 | 11/1984 | European Pat. Off. . | |
| 256200 | 4/1983 | France . | |
| 55-32239 | 3/1980 | Japan . | |
| 55-32240 | 3/1980 | Japan . | |
| 57-60540A | 4/1982 | Japan . | |
| 57-120276 | 7/1982 | Japan . | |
| 57-186236 | 11/1982 | Japan . | |
| 57-181435 | 11/1982 | Japan . | |
| 58-64644A | 4/1983 | Japan . | |
| 58-196661 | 11/1983 | Japan . | |
| 59-11583A | 1/1984 | Japan . | |
| 59-38973 | 3/1984 | Japan . | |
| 59-65939 | 4/1984 | Japan . | |
| 2037460 | 7/1980 | United Kingdom | 369/32 |
| 2085192 | 4/1982 | United Kingdom | 369/44 |
| 2122383 | 1/1984 | United Kingdom | 369/32 |

Primary Examiner—Aristotelis M. Psitos
Attorney, Agent, or Firm—Spensley Horn Jubas & Lubitz

[57] ABSTRACT

A pickup head position control device in an optical type disc reproducing device controls a pickup head position for a search operation for selection of a music piece. In this device, a tracking servo-control is periodically switched on and off while an optical head is forcibly moved toward a target position by driving a feed motor, a tracking actuator is deviated in the moving direction of the optical head by supplying a kick pulse to the tracking actuator when the tracking servo is off, and reading of a disc address is effected to conduct a search of a target position when the tracking servo is on.

5 Claims, 7 Drawing Sheets

HIGH SPEED, LOW POWER CONSUMPTION PICKUP HEAD POSITION CONTROL DEVICE IN AN OPTICAL TYPE DISC REPRODUCING DEVICE

BACKGROUND OF THE INVENTION

This invention relates to a device for controlling a pickup head position in a reproducing device for an optical type discs such as Compact Discs in the Compact Disc Digital Audio System and optical type video discs and, more particularly, to a device for controlling a pickup head position for a search operation for selection of a music piece.

Figure 1:
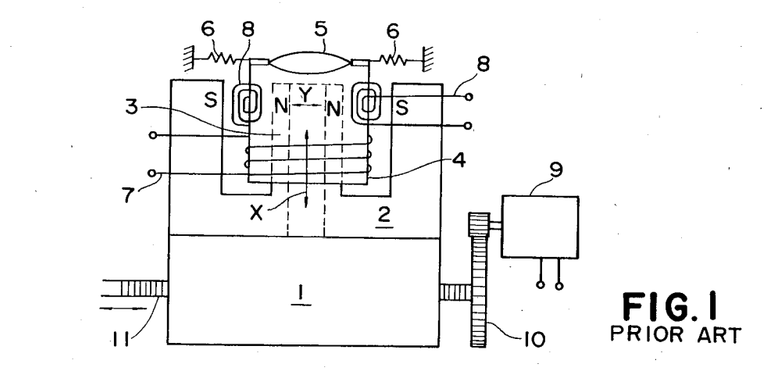
FIG. 1 is a view showing schematically a general construction of an optical head used in an optical type disc reproducing device.

A general construction of an optical head in an optical type disc reproducing device is shown in FIG. 1. The optical head is constructed of an optical system 1 and a magnetic circuit 2. The magnetic circuit 2 comprises a cylindrical center pole 3 formed in the center and a bobbin 4 provided about the center pole 3. An object lens 5 is provided on the outer end of the bobbin 4 and the bobbin 4 is supported by a suspension 6. On the bobbin 4 are wound a focus actuator (a vertically driving coil for focusing) 7 and a tracking actuator (a radially driving coil for tracking) 8. The object lens 5 is displaced by these actuators 7 and 8 in the vertical direction (i.e., direction normal to the disc surface) X and radial direction (i.e., radial direction of the disc) Y, and the focus of a laser beam projected through the cylindrical center pole 3 is controlled so that the laser beam is in focus at a specified track on the disc. The optical head is fed in the radial direction of the disc through a feed device composed of a feed motor 9, a reduction gear 10 and a feed gear 11.

An optical type audio disc reproducing device has a search function for searching designated musical piece etc. There have been the following pickup head position control devices for achieving the search function.

(1) A device of a type in which search is made by combination of oscillation (natural restoring force) of the suspensions 6 and on-off control of the tracking servo and employment of a forcible feed signal as disclosed in Japanese Patent Application No. 191434/1983. According to this device, a feed signal (a constant DC voltage) is applied to the feed motor 9 in a feed-servo-off state to forcibly displace the optical head toward a target position and during this period of time the tracking servo is periodically switched on and off to read position information at skipped locations on the disc and thereby achieve the search. When the tracking servo is off, the tracking actuator 8 is deviated toward the target position by the oscillation of the suspension 6 and the track is detected by switching on the tracking servo again at turning points of the oscillation at which the speed of oscillation becomes zero and reading of the disc position information is performed.

Figure 2:
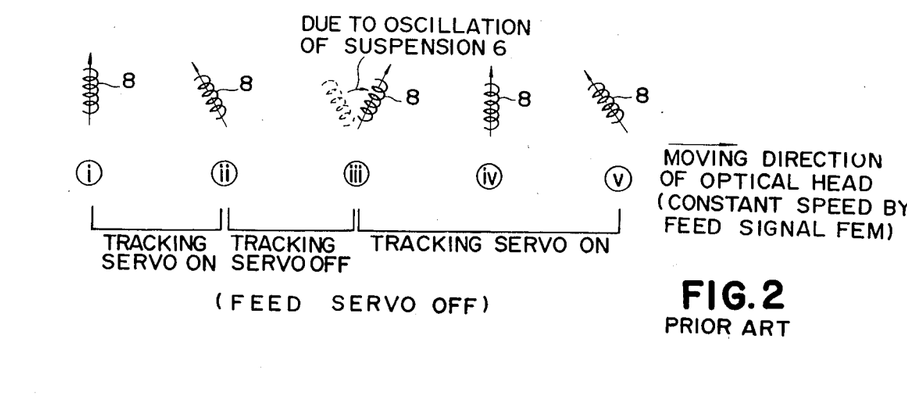
FIG. 2 is a diagram showing schematically the operation of the tracking actuator 8 during the search time in a prior art pickup head position control device utilizing oscillation of the suspension 6.

FIG. 2 schematically shows the movement of the tracking actuator 8 during this search. The tracking servo is on during the period i–ii and reading of the disc position information is performed. Since a forcible feed is performed during this period, the position of the track (i.e., position at which the laser beam is radiated) relative to the position of the optical head is gradually delayed so that the tracking actuator 8 is gradually deviated rearwardly. When the tracking servo is switched off at the point ii, the tracking actuator 8 is deviated toward the target position due to the oscillation of the suspension 6. At the turning point iii of the suspension 6, the tracking servo is switched on again to catch the track and effect reading of the disc position information during the period of iii–v. At the point v, the tracking servo is switched off and the suspension 6 is caused to effect the oscillation to deviate the tracking actuator 8. In this manner, the search of the target position is performed by setting the on-time and off-time of the tracking servo and reading the disc position information at skipped positions on the disc.

The reading device of the above described type is advantageous in that it can be constructed with low-price component parts, that the sequence control is easy to make as compared with a device of a type in which the position information is constantly read and that a quick search is available when the oscillation frequency of the suspension 6 is sufficiently high. On the other hand, the device of this type has the disadvantages that a quick search cannot be made when the oscillation frequency of the suspension 6 is low and that tolerance to irregularity of the oscillation frequency of the suspension 6 is relatively narrow, that is, when the off-time of the tracking servo is specifically determined, the position at which the tracking servo is switched on again does not necessarily coincide with the turning point of the oscillation of the suspension 6 (i.e., the position at which the oscillation speed becomes zero) if there is irregularity in the oscillation frequency of the suspension 6 resulting in failure in detecting the track.

(2) A device of a type in which a kick pulse is continuously given to effect the search.

According to the device of this type, the target position is detected by reading the disc position information while jumping the tracks by providing the kick pulse continuously. This is a modified form of fast-feed and fast-return functions of a conventional compact disc player of the Compact Disc Digital Audio System with increased speed.

The device of this type is advantageous in that the suspension 6 does not oscillate since the tracking servo is always on and, accordingly, the device is not affected adversely by the irregularity of the oscillation frequency of the suspension 6 (and other irregularities also) and that the cost of manufacture is reduced since the device does not require any special component parts for oscillation. The device, however, has the disadvantages that power consumption is relatively large since the kick pulses are continuously given, that a relatively heavy load acts on the tracking actuator 8 with a result that problems of generation of heat and reduction in reliability of the actuator 8 arise and that a quick search cannot be expected due to limitation in the allowable power in the tracking actuator 8.

(3) A device of a type in which a high-accuracy position detection and employment of the kick pulse are combined.

In contrast to the devices of (1) and (2) in which search is made while reading information during the movement of the optical head, the device of (3) utilizes a stepping motor as the feed motor 9 and does not effect reading of information during the movement of the optical head. According to this device, the stepping motor is driven by a certain amount depending upon difference between information of position before moving (i.e., present position) and the target position to bring the optical head to a position in close proximity of the target position while the tracking servo is off. Then the tracking servo is switched on and the tracking actuator 8 is driven by the kick pulse to search the target position.

This device is advantageous in that it has less element of instability than the devices of the other types and its operation is accurate because no reading of information is made during the movement of the optical head and that power consumption is relatively small since the kick pulse is given only in the last stage. The device, however, has the disadvantages that it requires a stepping motor which is quite expensive and that change in the target during the movement of the optical head is not possible or requires two operations (i.e., stopping and re-setting of the target position) because no reading of the position information is made during the movement of the optical head with a result that a quick search is not available.

SUMMARY OF THE INVENTION

It is, therefore, an object of the invention to provide a pickup head position control device in an optical type disc reproducing device capable of readily detecting a track after jump without being subjected to the influence of the irregularity of the oscillation frequency of the suspension.

It is another object of the invention to provide a pickup head position control device capable of conducting search at a fast search speed.

It is another object of the invention to provide a pickup head position control device capable of operating efficiently without requiring an increased power consumption.

It is still another object of the invention to provide a pickup head position control device capable of obviating an expensive motor such as a stepping motor.

For achieving the above described object, the present invention is characterized in that the tracking servo is periodically switched on and off while an optical head is forcibly moved toward a target position by driving a feed motor, a tracking actuator is deviated in the moving direction of the optical head by supplying a kick pulse to the tracking actuator when the tracking servo is off and reading of a disc address is effected to search the target position when the tracking servo is on.

According to the invention, a forcible track jumping is made by using a kick pulse without utilizing the oscillation of the suspension as in the device of type (1) described above so that the device of the invention is free from the influence of irregularity of the oscillation frequency of the suspension. Moreover, the forcible track jumping enables a faster search. Further, the increase in power consumption due to excessive use of the kick pulse can be avoided and the requirement of the expensive stepping motor as the feed motor can be eliminated.

BRIEF DESCRIPTION OF THE DRAWINGS

In the accompanying drawings.

DESCRIPTION OF PREFERRED EMBODIMENT

Figure 3:
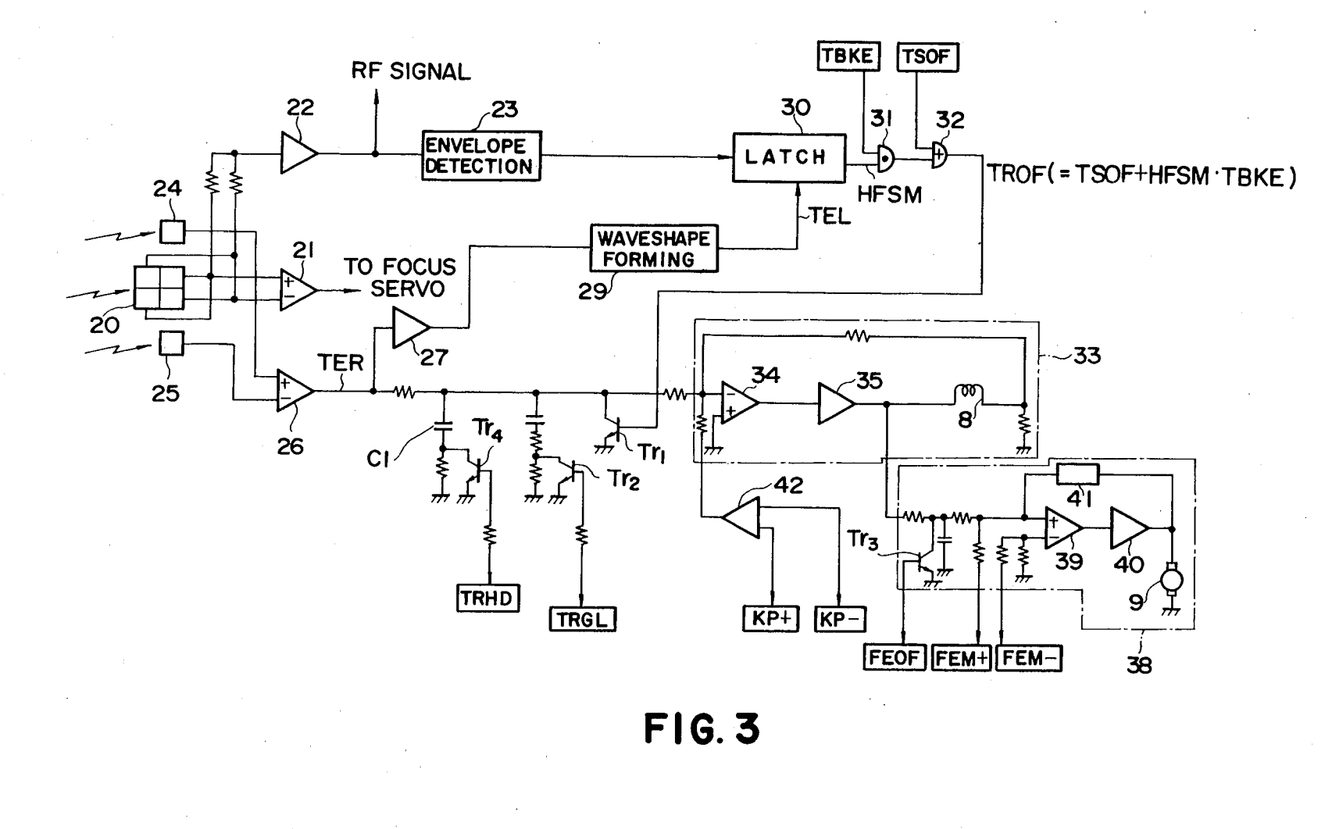
FIG. 3 is a circuit diagram showing an embodiment of the present invention, illustrating the entire circuit for tracking and feed controls.

Referring to FIG. 3, description will now be made about an embodiment of the invention applied to a Compact Disc playback device.

FIG. 3 shows the entire circuit for the tracking control and the feed control. Before describing the circuit of FIG. 3, explanation will be made about various commands used in this embodiment (including not only the search command but all other commands) and control signals to be given to the circuit of FIG. 3 for executing these commands.

In this embodiment, commands having the command names of "0 mode", "1 (1-0, 1-½) mode", "2 mode", "3 (3-0, 3-½) mode"), "4 (4-0, 4-½) mode", "5 (5-0, 5-½) mode", "6 (6-0, 6-½) mode" and "7 mode" are employed. The name "1 (1-0, 1-½) mode" means that the command of 1 mode has 1-0 mode and 1-½ mode. In case of referring the mode with both the 1-0 mode and the 1-½ mode, it is simply referred to as the 1 mode. If the two modes should be distinguished from each other, each command name (1-0 or 1-½) should be used. The same is the case with the 3, 4, 5 and 6 modes. The figures "0" are "½" at the end of the respective modes are intended to indicate that the commands indicated by these figures have contents of opposite characters.

Contents of the respective commands are as follows:

(a) 0 mode (STOP):
  A command to stop all the operations.
(b) 1-0 mode (FEED FORWARD):
  A command to move the optical head toward the outer tracks of the disc.
(c) 1-½ mode (FEED RETURN):
  A command to return the optical head to the end portion at the innermost tracks of the disc when, for example, ending the playback.
(d) 2 mode (FOCUS START):
  A command to start focusing of the laser beam.
(e) 3-0 mode (DISC START):
  A command to detect whether the disc is on the tray or not by rotating the tray a little and examining inertia when the tray on which the disc is to be mounted has been received in the compact disc playback apparatus.
(f) 3-½ mode (DISC BRAKE):
  A command to brake the motor rotating the disc (to apply the inverse voltage).
(g) 4-0 mode (PLAY):
  A play command.
(h) 4-½ (PLAY MUTE):
  A command to mute the reproduction signal, given, for example, at the time of PAUSE.
(i) 5-0 mode ( ▷▷+):
  A command to feed fast.
(j) 5-½ mode ( ▷▷−):
  A command to return.
(k) 6-0 mode ( ▷▷▷+):

A command to feed at a high speed (when the 5-0 mode operation has been performed for two seconds, for example, the operation automatically shifts to the 6-0 mode).

(l) 6-½ mode (▷ ▷ ▷ −):

A command to return at a high speed (when the 5-½ mode operation has been performed for two seconds, for example, the operation automatically shifts to the 6-½ mode).

(m) 7 mode (PAUSE, SEARCH):

A pause command, a command to retrieve the target address. The pause command is treated as the search command in which the present play address is the target address.

The 7 mode is further classified as shown in the following table depending upon time difference between the present address and the target address:

| Command Name of the 7 mode | Sign of the time difference | Absolute value of the time difference |
| --- | --- | --- |
| 7-0 | + | less than 16 frames |
| 7-4 | − | (¼ seconds) |
| 7-1 | + | not less than 16 frames |
| 7-5 | − | and less than 4 seconds |
| 7-2 | + | not less than 4 seconds |
| 7-6 | − | and less than 128 seconds |
| 7-3 | + | not less than 128 |
| 7-7 | − | seconds |

The control for periodically switching on and off the tracking servo of the invention is performed in the 7-3 and 7-7 modes in which the time difference is at the maximum.

Various command signals given to the circuit of FIG. 3 for executing the above described commands will now be described.

(1) Control signals for the tracking control

TSOF (tracking servo-off signal):

This is a signal which periodically switches on and off the tracking servo in the 7-3 or 7-7 mode. The tracking servo is switched on when this signal is "0" and switched off when this signal is "1".

Figure 4:
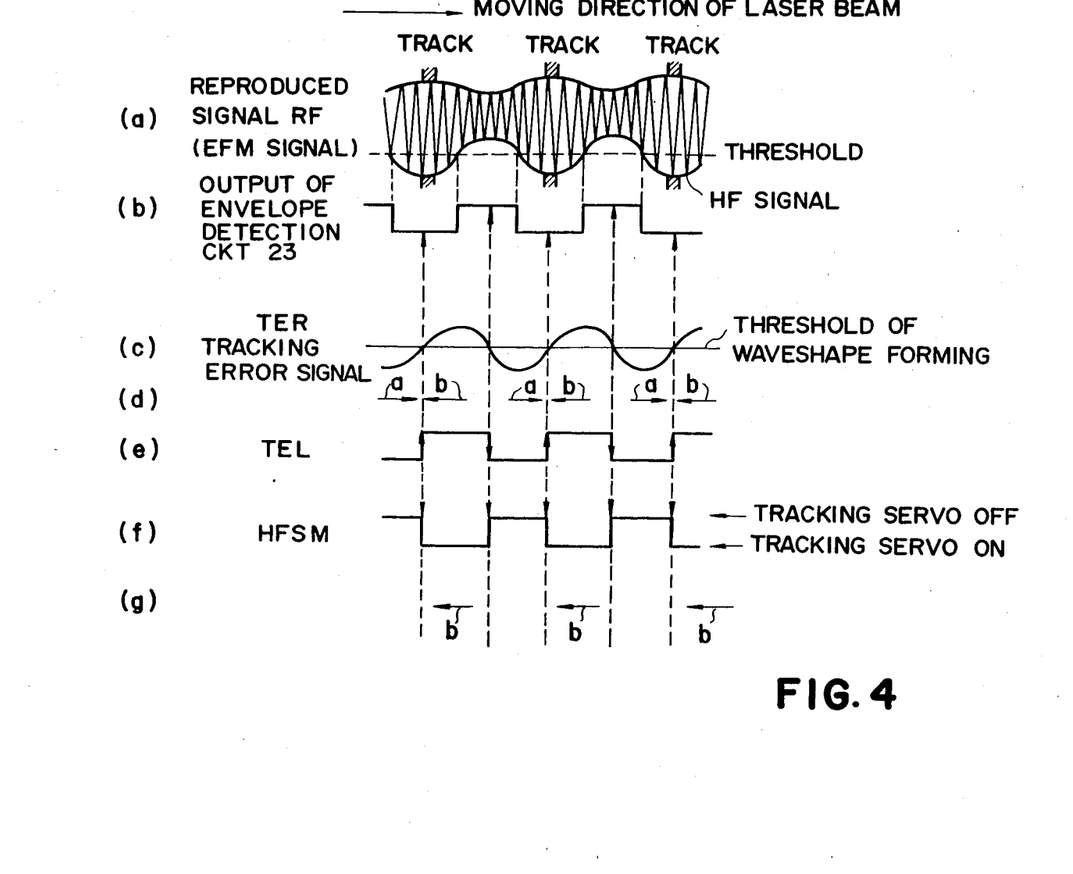
FIG. 4, (a)-(g), is a waveform diagram showing a process of forming of a trackinag servo muting signal HFSM.

TBKE (tracking brake enable signal):

This is a signal to determine the timing at which the tracking servo muting (i.e., a control switching off the tracking servo) is effected according to a tracking servo muting signal HFSM to be described later (FIG. 4(f)). While the optical head is moving or after it has moved, TBKE rises to "1" for a given period of time during which the tracking servo muting is effected. TRGL (tracking gain control signal):

This is a signal used to switch the tracking servo gain over. In the normal playback, too high a tracking servo gain results in an instable tracking so the tracking servo gain is made to stay low. On the other hand, for such motion of the head as kicking (track jump) or feeding, the tracking servo gain is raised to obtain immediate tracking after kicking or feeding. When TRGL="1", the tracking servo gain is low and when TRGL="0", it is high.

TRHD (tracking hold signal):

Kicking causes the light beam to cross the track, generating a great tracking error signal. At this time, if the tracking servo loop is closed, this tracking error signal is fed back, rendering the tracking control after kicking instable. While kicking, therefore, the tracking error signal before the kicking is held by turning the tracking hold signal TRHD to "1" and when the kicking ends, the tracking error signal having been held is applied for the tracking control.

KP± (kick pulses):

These are signals for effecting track jump, KP+ being for an outward track jump and KP− for an inward track jump. Immediately after one of these kick pulses is generated, the other opposite kick pulse (brake pulse) is generated to provide braking.

(2) Control signals for the feed control

FEOF (feed servo-off signal):

This is a signal used to switch off the feed servo loop in any of the 0 to 3 modes. In these modes, the feed servo is unnecessary and besides a forcible feed, when accompanied with the feed servo, causes shaking. FEOF is used to switch off the feed servo in such a case. The feed servo is on when FEOF="0" and off when FEOF="1".

FEM± (feed signal):

This is a signal to effect a forcible feed in the 1 mode or in the 7-3 or 7-7 mode, FEM+ being for the outward feeding and FEM− for the inward feeding.

Description will now be made about the circuit shown in FIG. 3 which is driven by the above described control signals.

In FIG. 3, laser beam reflected from the disc is incident on a 4-split photodiode 20 and tracking photodiodes 24 and 25.

An output of the 4-split photodiode 20 is added to its diagonal counterpart. The two addition outputs are subtracted one from the other in a subtractor 21 so as to be used for the focus control. Also, these two addition outputs are added together by an adder 22 to produce an RF signal (FIG. 4(a)), which is delivered to a signal processing circuit (not shown) for signal reproduction. An envelope detection circuit 23 compares an HF signal contained in the RF signal with an appropriate threshold and waveshapes it into a signal "1" or "0" (FIG. 4(b)). Meantime, the signals obtained from tracking photodiodes 24, 25 are subtracted from one another by a subtractor 26 to detect the tracking error signal TER (FIG. 4(c)).

The tracking error signal TER through a buffer amplifier 27 has its waveshape formed (zerocross detected) by a waveshape forming circuit 29. At the rise and fall of a waveshape forming signal TEL (FIG. 4(e)) from the circuit 29, the output of the envelope detection circuit 23 is latched in a latch circuit 30 to prepare the tracking servo muting signal HFSM. HFSM is a tracking servo muting signal. A tracking error signal is obtained when the head is moved (fed or kicked) across the track of the disc. To facilitate the tracking, only that portion of polarity of the tracking error signal which acts to brake the head as it moves forward is used and, therefore, the opposite polarity portion is muted by HFSM. More specifically, when the head is moving, a tracking error signal TER as shown in FIG. 4(c) is obtained. If TER is used as it is for the tracking control, a force in a direction a acting in the accelerating direction and a force in a direction b acting in the braking direction are obtained alternately as shown in FIG. 4(d). As shown in FIG. 4(g), therefore, only the force b acting in the braking direction is allowed to work by switching on and off the tracking servo by preparing the tracking servo muting signal HFSM in synchronism with the tracking error signal TER as shown in FIG. 4(f). When the head is moving in the opposite direction, since the tracking error signal TER is inverted, the force in the direction a is allowed to work so braking can be exercised in like manner.

The tracking servo muting signal HFSM and the tracking brake enable signal TBKE are applied to an AND gate 31 to obtain the logical product. Further, this logical product and the tracking servo-off signal TSOF are applied to an OR gate 32 to obtain the logical sum which constitutes a tracking servo-open signal TROF.

TROF (tracking servo-open signal) is a signal for switching off the tracking servo and produced according to the logical equation:

TROF=TSOF+TBKE·HFSM

The tracking servo is switched off when TROF="1" and switched on when TROF="0". TSOF is a signal which switches the tracking servo on and off periodically in the 7-3 or 7-7 mode as described before to enable the disc position information (Q subcode time information) to be read in skipped locations.

The tracking error signal produced from the subtractor 26 is applied, through a servo amplifier 34 and drive amplifier 35 to a tracking actuator 8 to effect the tracking control in a tracking servo circuit. 33. The tracking servo-off signal TROF turns off the tracking servo by turning a transistor Tr1 on and makes the input of the tracking error signal TER to the tracking servo circuit 33 off. The switching of the tracking gain is effected by applying the tracking gain signal TRGL to a transistor Tr2. Specifically, the tracking gain is switched to the low gain by turning the transistor Tr2 on with TRGL="1" and to the high gain by turning the transistor Tr2 off with TRGL="0". The kick pulses KP± are applied to the tracking servo circuit 33 through an amplifier 42.

A feed servo circuit 38 normally integrates the tracking control signal which is supplied to the tracking actuator 8 and, based upon the integrated value (feed servo signal), actuates a feed motor 9 through a servo amplifier 39 and drive amplifier 40 to perform the feed servo. An element designated by 41 is a feedback network comprising resistor(s) and capacitor(s). In the 1 mode, a transistor Tr3 is turned on by the feed servo-off signal FEOF to switch off the feed servo and, instead thereof, the feed signal FEM+ or FEM− is applied to effect the feed control. In the 7-3 or 7-7 mode, the feed control is effected by adding the feed signal FEM+ or FEM− to the feed servo signal applied to the servo amplifier 39 based on the tracking control signal while the transistor Tr3 is maintained in the OFF state. In the mode 1 or 7-3 or 7-7, a transistor Tr4 is turned on in response to the tracking hold signal TRHD to hold in a capacitor C1 the tracking error signal TER in the state it assumes immediately before the feed is effected and when the feed ends, the transistor Tr4 is turned off to resume the tracking control using the tracking error signal held in the capacitor C1. In this way, the tracking control can enjoy stability immediately after the feed ends.

Figure 5:
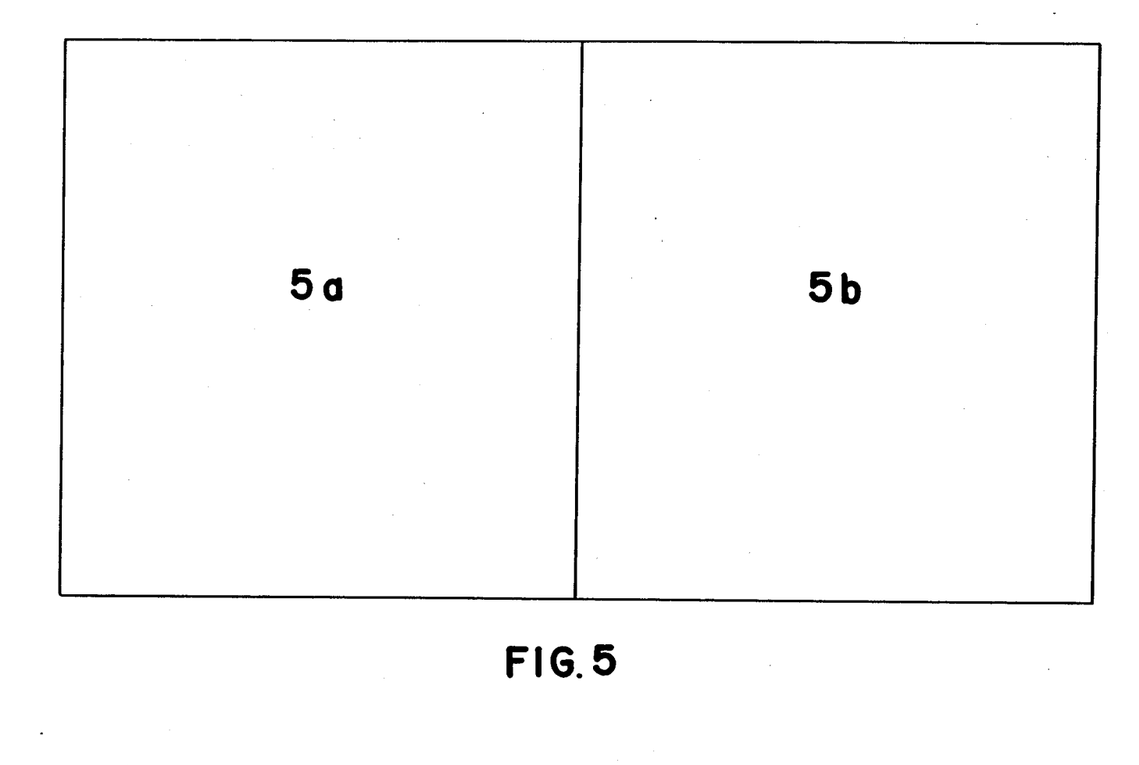
FIGS. 5a and 5b is a chart showing control signals applied to the circuit of FIG. 3 with respect to each mode.
Figure 5A:
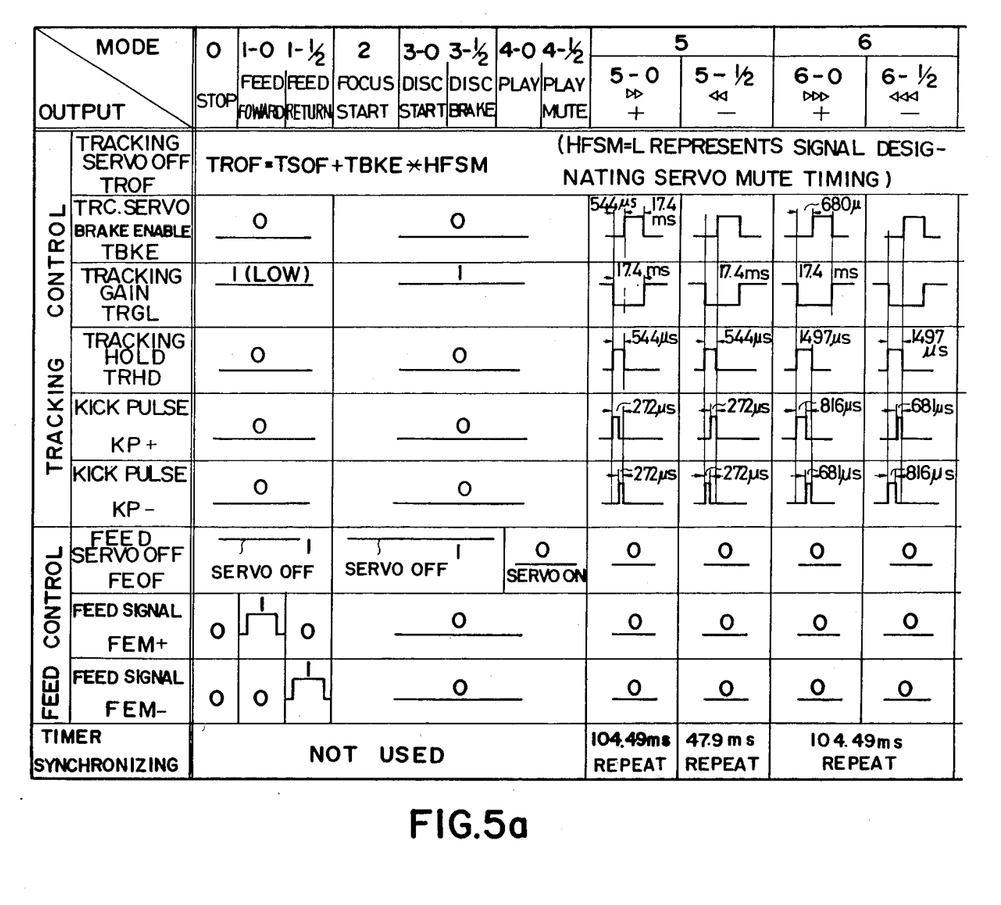
Figure 5B:
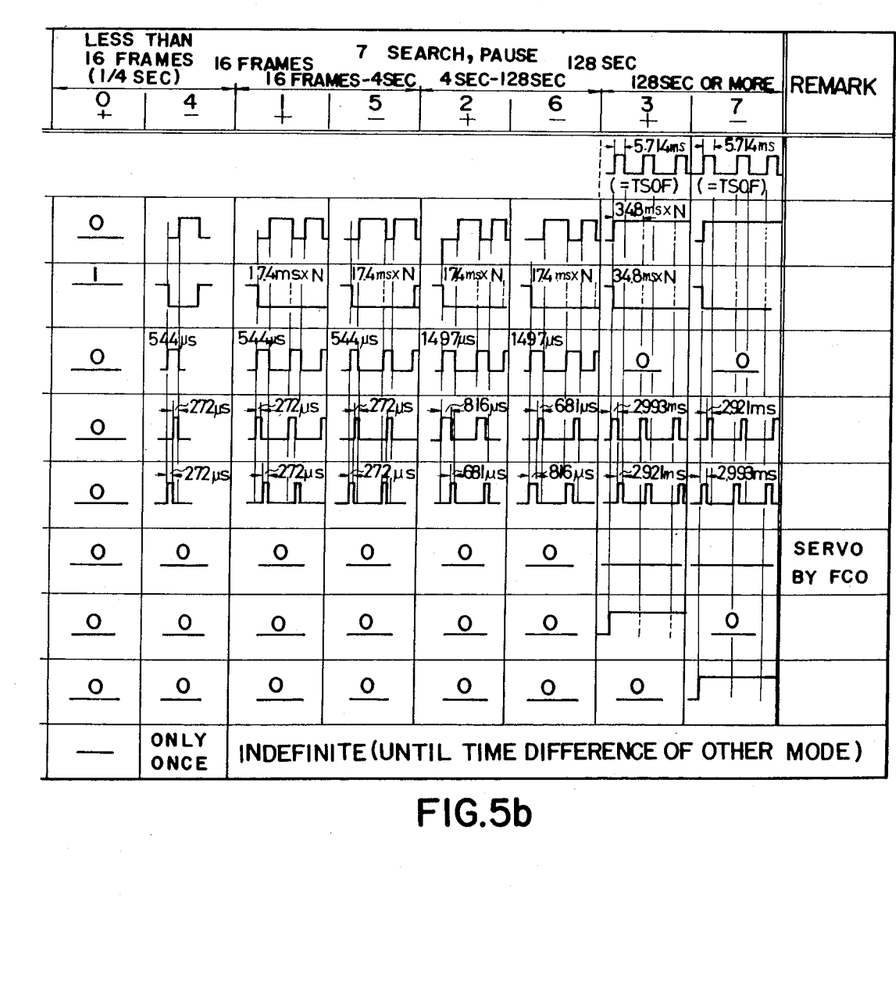

Contents of the control signals applied to the circuit of FIG. 3 in the respective modes are shown in FIG. 5.

Description will now be made about the contents of the control signals shown in FIG. 5 with respect to each mode.

0, 1, 2, 3 and 4 modes
(a) The tracking servo is kept on all the time with TBKE="0".

(b) Because of the stable state, the servo gain is switched to the low gain with TRGL="1".

(c) In the 0 mode to 3 mode, the feed servo is turned off with FEOF="1". In the 4 mode, the feed servo is turned on with FEOF="0".

(d) In the 1-0 mode (FEED FORWARD), the feed motor 9 is actuated so as to feed the head toward the outer tracks of the disc with FEM+="1". In the 1-½ mode (FEED RETURN), the optical head is returned to the reset position with FEM−="1".

5-0 mode (fast feed)
(a) A combination of the kick pulse KP+ and the brake pulse KP− is produced at time intervals of 104.49 ms to allow the head to jump the tracks one by one. Both the actuating pulse KP+ and the brake pulse KP− consist of pulse strokes each lasting 272 μs.

(b) While the kick pulses KP+, KP− are generated, the actuator position data on the position of the tracking actuator 8 in the head before the kick, i.e., the tracking error signal, is held with TRHD="1". After the head is moved in response to the kick pulse, the tracking control resumes according to that tracking error signal once held.

(c) After the kick pulses KP+, KP− are produced, the servo gain is enhanced with TRGL="0" for a certain period of time (17.4 ms) so as to facilitate application of the tracking servo.

(d) TBKE is kept at "1" for a certain time period (17.4 ms–544 μs) after the kick pulses KP+, KP− are produced to allow only the tracking error signal component acting to brake the head in its advance movement (FIG. 4) to work so as to enable the tracking.

5-½ mode (return)
This mode is basically reverse to the 5-0 mode: the actuating pulse KP− for inward movement is first produced, followed by the brake pulse KP+. However, in the return mode, the track advances while jumping due to the rotation of the disc. Accordingly, if the combination of the kick pulse KP− and the brake pulse KP+ were generated in this return mode at the same intervals as in the fast feed mode, the actual feed speed in the return mode would be smaller than that in the fast feed mode. According to this embodiment, thereforp, the time intervals at which the combination of the kick pulse KP− and the brake pulse KP+ is generated is set at such a short period as 47.9 ms in the return mode to reduce the kick repeat cycle so that the feed speed in the return mode may be equal to the feed speed in the fast forward feed mode.

6-0 mode (very fast forward feed)
(a) In this mode, the kick pulse KP+ consists of strokes each lasting for 816 μs to enable the head to jump many tracks at a time. The brake pulse KP− is set at 681 μs.

(b) The kick pulses KP± are generated at time intervals of 104.49 ms.

6-½ mode (very fast return feed)
(a) Reversely to the 6-0 mode, first the kick pulse KP− is generated at time intervals of 816 μs, followed by the brake pulse KP+ which is produced at time intervals of 681 μs.

(b) In the 6 mode, the advance in the track while jumping due to the rotation of the disc is of a negligible order as compared with the advance in the 5-½ mode in relation to a great amount of jump. Accordingly, the pulses KP± are generated at time intervals of 104.49 ms as in the 6-0 mode.

7 mode (search, pause)

The 7 mode is classified into four states, as described before, according to the time difference between the target position and the present position.

(i) 7-3, 7-7 mode (the time difference is not less than 128 seconds; 7-3 mode is case where the sign is +, i.e., the target position is ahead of the present position (toward the outer track) whereas 7-7 mode is the case where the sign is —, i.e., the target position is behind the present position (toward the inner track).)

(a) Since the kick pulses KP± are inadequate because of a great time difference, the head is fed forcibly with FEM+ (in the case of the 7-3 mode) or FEM— (in the case of the 7-7 mode) at "1".

(b) Meantime, TBKE="1" (the tracking brake can be effected according to the tracking servo muting signal HFSM) and TRGL="0" (the servo loop gain is switched to the high gain).

(c) The operation is repeated at time intervals of 34.8 ms until the time difference between the target and present positions is reduced to less than 128 seconds.

(d) The tracking servo is turned off for 5.714 ms in every time interval with TSOF="1".

(e) Meantime, a kick pulse of 2.993 ms (KP+ in the 7-3 mode and KP— in the 7-7 mode) and a brake pulse of 2.721 ms (KP— in the case of the 7-3 mode and KP+ in the case of the 7-7 mode) are produced to jump tracks in the moving direction of the optical head.

(f) After the track jumping, the tracking servo is switched on again to effect tracking and read the time information in the Q subcode.

(g) The 7-3, 7-7 mode is repeated at time intervals of 34.8 ms until the time difference becomes less than 128 seconds whereby reading of the Q subcode time information is performed at skipped locations.

(h) In the 7-3, 7-7 mode, the feed servo is kept in the ON state even during the forcible feeding by the feed signal FEM±. Since the feed servo is formed as an integrated value of the tracking error signal for servo and, when the feed servo is on, the system functions to control the tracking servo properly by feeding back the information as to whether the tracking servo is proper or not, various irregularities are absorbed in the form of increase or decrease in the moving speed of the optical head (i.e., the system has a stabilizing function). More specifically, by increasing or decreasing the moving speed the pickup head determined by the constant feed signal FEM± with the feed servo signal which is obtained by integrating the tracking servo signal with respect to deviation of the tracking actuator 8 due to the kick, the amount of deviation of the tracking actuator 8 can be maintained at a proper value even during the forcible moving by the feed signal FEM.

(ii) 7-2, 7-6 mode (in which the time difference ranges from four seconds to 128 seconds; the sign is + in 7-2 mode and — in 7-6 mode).

A kick pulses KP± of 816 μs (KP+ in the 7-2 mode and KP— in the 7-6 mode) and a brake pulse of 681 μs (KP+ in the 7-2 mode and KP— in the 7-6 mode) are produced. These pulses are generated repeatedly at time intervals of 17.4 ms until the time difference has approximated to less than four seconds.

(iii) 7-1, 7-5 mode (in which the time difference ranges from 16 frame (¼ second) to four seconds; the sign is + is 7-1 mode and — in 7-5 mode).

A kick pulses KP± of 272 μs (KP+ in the 7-1 mode and KP— in the 7-5 mode) and a brake pulse of 272 μs (KP— in the 7-1 mode and KP+ in the 7-5 -mode) are produced. These pulses are generated repeatedly at time intervals of 17.4 ms until the time difference has approximated to less than 16 frame (¼ second).

(iv) 7-0, 7-4 mode (the time difference is less than 16 frame (¼ second); the sign is + in 7-0 mode and — in 7-4 mode).

(a) A one-track jump is effected in the 7-4 mode by kick pulse KP— in 272 μs and brake pulse KP+ of 272 μs. This jump is effected only once and not repeated, because this jump is made in close proximity to the target position.

(b) In the 7-0 mode, since the target position is ahead of the present position, it is possible in the normal playback mode to reach the target position with the disc rotating. Therefore, arrival at the target position is only to be awaited without performing any further operation.

In the above-described manner, the control is switched stepwisely in the 7 mode to approach the target position. Upon completion of reaching the target position, the control is switched to the 4-0 mode (play mode) etc. and playback and other operation are performed.

Figure 6:
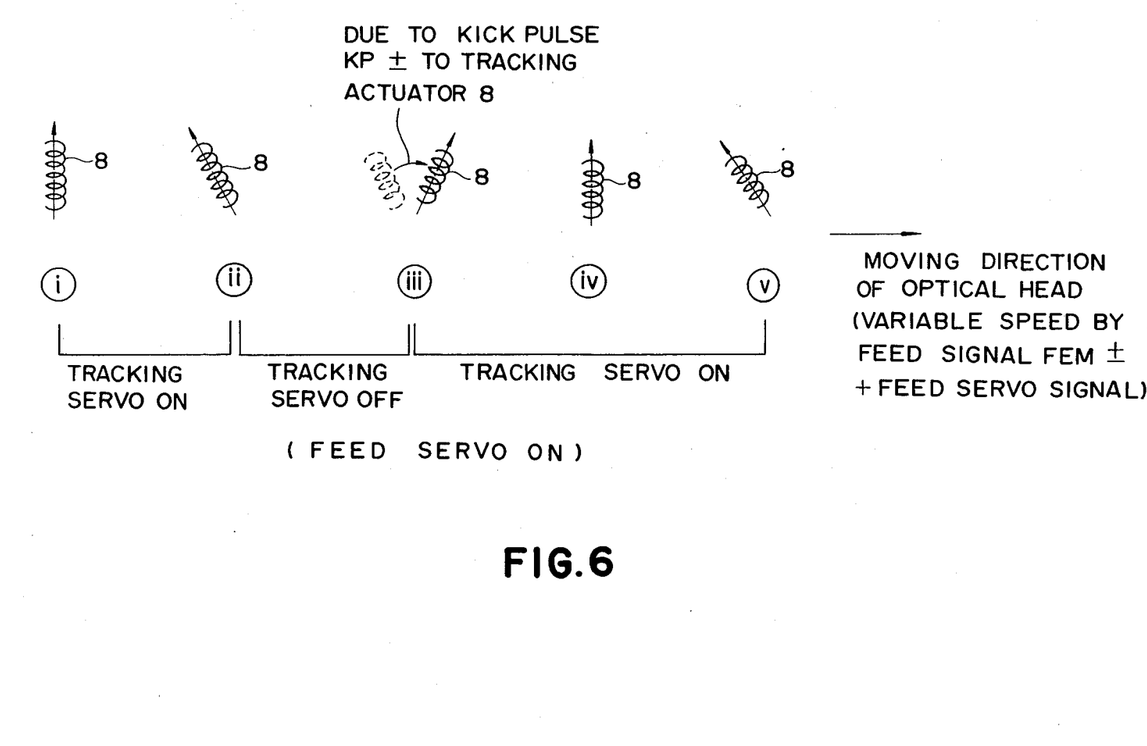
FIG. 6 is a diagram showing schematically the operation of the tracking actuator during the search time of the pickup head position control device according to the invention.

FIG. 6 schematically shows the movement of the tracking actuator 8 in the 7-3 or 7-7 mode. In the period of i to ii in the figure, the tracking servo is on and reading of the Q subcode time information is effected. Since the forcible feeding is performed during this period, the track position (i.e., the position at which the laser beam is projected) becomes gradually delayed with respect to the position of the optical head so that the tracking actuator 8 is gradually deviated rearwardly. Since the feed servo is on during this time, the feed signal FEM± is decreased by being subtracted by the feed servo signal thereby causing the moving speed of the optical head to be decreased. Thus, the amount of deviation of the tracking actuator 8 is controlled at a proper value.

At the position of ii, the tracking servo is switched off and the kick pulse KP± is applied to the tracking actuator 8 to perform the track jump. Upon effecting of the track jump, the tracking actuator 8 is deviated in the moving direction of the optical head. Since the feed servo is on at this time, the feed signal FEM± is added with the feed servo signal and therefore increases thereby causing the moving speed of the optical head to increase. Thus, the amount of deviation of the tracking actuator 8 is controlled to be within a proper range. It should be noted that, if the feed is performed at a constant speed only by the feed signal FEM± with the feed servo being in an OFF state, the tracking actuator 8 will tend to be locked in the state of either ii or iii. In other words, in the absence of the feed servo which inherently has a feedback function, excess or shortage of the feed is likely to occur in a greater degree.

Upon completion of the track jump, the tracking servo is switched on at iii to effect tracking. Reading of the Q subcode time information is performed in the period of iii-V and the tracking servo is switched off again at V to perform the track jump. In the foregoing manner, the reading of the Q subcode time information is effected at skipped locations to retrieve the target position.

The foregoing description has been made with respect to the embodiment in which the disc is fixed to a turntable in a fixed position and the optical head is fed. The invention is applicable also to a disc reproducing device of a type in which the optical head is fixed and the disc is fed. Further, the invention is applicable not only to an optical type disc reproducing device for compact discs of the Compact Disc Digital Audio System but also to an optical type disc reproducing device for other discs such as video discs.

What is claimed is:

1. A pickup head position control device in an optical type disc reproducing device comprising:
an optical head having an optical system projecting a laser beam from a laser source on a disc and receiving reflected or transmitted laser beam from the disc thereby to read information recorded on the disc, and a tracking actuator for changing an optical path of said optical system for performing a tracking control;
optical head feed means having a feed motor for moving the optical head, means for generating an optical head feeding drive signal and means for servo-controlling the feed operation;
tracking control means having tracking error detection means, means for generating a tracking actuator drive signal in response to a tracking error signal and means for servo-controlling the tracking control;
tracking servo switching means for periodically switching on and off the tracking servo-control operation, wherein said tracking servo switching means includes means for detecting when the tracking error has a value which will result in braking of the optical head and means for causing the tracking servo-control operation to be switched on in a period of time during which the tracking error will result in braking;
kick pulse drive means for generating a kick pulse for jumping over tracks and driving said tracking actuator when the tracking servo-control operation is in an off state; and
position information detection means for detecting position of the disc which the optical head is presently accessing by reading position information recorded on the disc, said detection being performed when the tracking servo-control operation is in an on state.

2. A pickup head position control device as defined in claim 1 further comprising a tracking gain switching circuit for increasing a tracking gain to facilitate the tracking servo operation when the tracking servo-control is switched from an off state to an on state.

3. A pickup head position control device as defined in claim 1 further comprising a tracking error signal holding means for holding, when the tracking servo-control is in an off state, a tracking error signal immediately before the tracking servo-control is switched off and starting the tracking-servo control by means of the held tracking error signal when the tracking servo-control becomes in an on state.

4. A pickup head position control device as defined in claim 1 including means for generating an external feed command signal of predetermined value, wherein said optical head feed means is driven by said external feed command signal or, normally, by a signal provided by integrating the tracking actuator drive signal.

5. A pickup head position control device as defined in claim 1 wherein said kick pulse drive means includes means for increasing the pulse width and thereby the number of tracks jumped over for each kick pulse as the speed of feeding of the optical head increases.

* * * * *